(12) United States Patent
Camacho et al.

(10) Patent No.: US 8,576,136 B2
(45) Date of Patent: Nov. 5, 2013

(54) ELECTRONIC DEVICE ANTENNA

(75) Inventors: Eduardo Lopez Camacho, Watsonville, CA (US); Bing Chiang, Cupertino, CA (US); Douglas B. Kough, San Jose, CA (US); Hao Xu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/616,765

(22) Filed: Sep. 14, 2012

(65) Prior Publication Data

US 2013/0002519 A1    Jan. 3, 2013

Related U.S. Application Data

(62) Division of application No. 12/337,499, filed on Dec. 17, 2008, now Pat. No. 8,269,674.

(51) Int. Cl.
   *H01Q 1/24*    (2006.01)

(52) U.S. Cl.
   USPC ............................ 343/793; 343/702; 343/906

(58) Field of Classification Search
   USPC ................................. 343/702, 792, 906, 793
   See application file for complete search history.

(56) References Cited

U.S. PATENT DOCUMENTS

| | | |
|---|---|---|
| 5,394,160 A | 2/1995 | Iwasaki et al. |
| 5,943,018 A | 8/1999 | Miller |
| 7,415,265 B2 | 8/2008 | Noro et al. |
| 2002/0122007 A1 | 9/2002 | Jansen |
| 2005/0062671 A1* | 3/2005 | Berezin et al. ............... 343/846 |
| 2005/0237255 A1 | 10/2005 | Zhang et al. |
| 2005/0254591 A1 | 11/2005 | Weil |
| 2006/0033666 A1* | 2/2006 | Su et al. ................. 343/700 MS |
| 2006/0244663 A1 | 11/2006 | Fleck et al. |
| 2011/0063779 A1 | 3/2011 | Ochi et al. |

* cited by examiner

*Primary Examiner* — Dieu H Duong
(74) *Attorney, Agent, or Firm* — Treyz Law Group; G. Victor Treyz; David C. Kellogg

(57) ABSTRACT

Antennas for electronic devices such as portable computers are provided. An antenna may have a dipole structure in which one antenna element serves as a matching element and another antenna element serves as a radiating element. The antenna elements may be mounted on a substrate. The substrate may be mounted on a support structure that is attached to a grounding plate. The grounding plate may be grounded to a conductive housing portion of a portable computer. The antenna may be mounted within the conductive housing in the vicinity of an opening in the housing. The opening may be a slot opening that is used to accommodate optical disks or other storage media. Radio-frequency signals for the antenna may pass through the opening.

24 Claims, 6 Drawing Sheets

ELECTRONIC DEVICE ANTENNA

This application is a division of patent application Ser. No. 12/337,499, filed Dec. 17, 2008 now U.S. Pat. No. 8,269,674, which is hereby incorporated by referenced herein in its entirety. This application claims the benefit of and claims priority to patent application Ser. No. 12/337,499, filed Dec. 17, 2008.

BACKGROUND

This invention relates to electronic devices and, more particularly, to antennas for electronic devices such as portable computers.

Portable computers often use wireless communications circuitry. For example, wireless communications circuitry may be used to communicate with local area networks and remote base stations.

Wireless computer communications systems use antennas. It can be difficult to design antennas that perform satisfactorily in portable computers. To conserve battery power, it is generally desirable to create efficient antennas. At the same time, optimum antenna efficiency can be difficult to obtain, because portable computer designs restrict the possible locations for implementing the antennas and require that the antennas be constructed as small light-weight structures. For example, it can be difficult to implement efficient antennas in portable computers that contain conductive housing structures, because the conductive housing structures can block radio-frequency signals and thereby reduce the effectiveness of the antennas.

It would therefore be desirable to be able to provide improved antenna arrangements for electronic devices such as portable computers.

SUMMARY

An antenna for an electronic device such as a portable computer is provided. The antenna may use a dipole design having first and second antenna elements. The electronic device may have a conductive housing having an opening such as an optical disk drive slot or other media drive opening. The antenna may be mounted within the conductive housing in the vicinity of conductive housing walls and the opening.

An unbalanced transmission line such as a coaxial cable may be used to feed the antenna. An outer ground conductor from the coaxial cable may feed the first antenna element and a center connector from the coaxial cable may feed the second antenna element.

The first antenna element may serve as an impedance matching element. The second antenna element may serve as a radiating element. During operation, radio-frequency signals may pass between the antenna and external equipment through the slot in the conductive housing wall.

Further features of the invention, its nature and various advantages will be more apparent from the accompanying drawings and the following detailed description of the preferred embodiments.

DETAILED DESCRIPTION

The present invention relates to antenna structures for electronic devices. The antennas may be used to convey wireless signals for suitable communications links. For example, an electronic device antenna may be used to handle communications for a short-range link such as an IEEE 802.11 link (sometimes referred to as WiFi®) or a Bluetooth® link. An electronic device antenna may also handle communications for long-range links such as cellular telephone voice and data links.

Antennas such as these may be used in various electronic devices. For example, an antenna may be used in an electronic device such as a handheld computer, a miniature or wearable device, a portable computer, a desktop computer, a router, an access point, a backup storage device with wireless communications capabilities, a mobile telephone, a music player, a remote control, a global positioning system device, devices that combine the functions of one or more of these devices and other suitable devices, or any other electronic device. With one suitable arrangement, which is sometimes described herein as an example, the electronic devices in which the antennas are provided may be portable computers such as laptop (notebook) computers. This is, however, merely illustrative. Antennas may, in general, be provided in any suitable electronic device.

Figure 1:
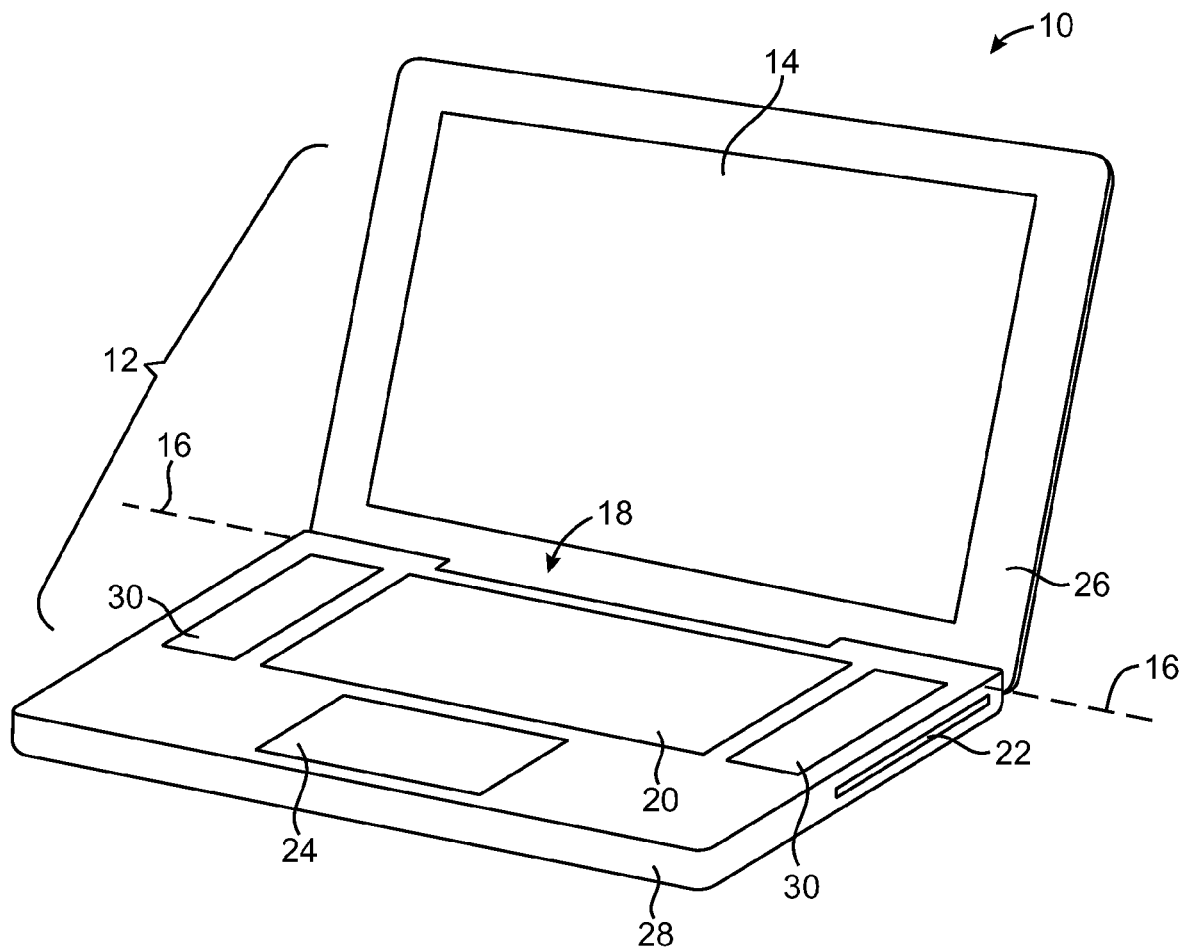
FIG. 1 is a perspective view of an illustrative electronic device such as a portable computer in which an antenna may be implemented in accordance with an embodiment of the present invention.

An illustrative electronic device such as a portable computer in which an antenna may be provided is shown in FIG. 1. As shown in FIG. 1, portable computer 10 may have a housing 12. Housing 12, which is sometimes referred to as a case, may be formed from one or more individual structures. For example, housing 12 may have a main structural support member that is formed from a solid block of machined aluminum or other suitable metal. Multipart housings may be used in which two or more individual housing structures are combined to form housing 12. The structures in housing 12 may include internal frame members, external coverings such as sheets of metal, etc. Housing 12 and its associated components may, in general, be formed from any suitable materials such as such as plastic, ceramics, metal, glass, etc. An advantage of forming housing 12 at least partly from metal is that metal is durable and attractive in appearance. Metals such as aluminum may be anodized to form an insulating oxide coating.

Case 12 may have an upper portion 26 and a lower portion 28. Lower portion 28 may be referred to as the base unit housing or main unit of computer 10 and may contain components such as a hard disk drive, battery, and main logic board. Upper portion 26, which is sometimes referred to as a cover or lid, may rotate relative to lower portion 28 about rotational axis 16. Portion 18 of computer 10 may contain a hinge and associated clutch structures and may sometimes be referred to as a clutch barrel.

Lower housing portion 28 may have an opening such as slot 22 through which optical disks may be loaded into an optical disk drive. Lower housing portion 28 may also have touchpad 24, keys 20, and other input-output components. Touch pad 24 may include a touch sensitive surface that allows a user of computer 10 to control computer 10 using touch-based commands (gestures). A portion of touchpad 24 may be depressed by the user when the user desires to "click" on a displayed item on screen 14. If desired, additional components may be mounted to upper and lower housing portions 26 and 28. For example, upper and lower housing portions 26 and 28 may have ports to which cables can be connected (e.g., universal serial bus ports, an Ethernet port, a Firewire port, audio jacks, card slots, etc.). Buttons and other controls may also be mounted to housing 12.

If desired, upper and lower housing portions 26 and 28 may have transparent windows through which light may be emitted from light-emitting diodes. Openings such as perforated speaker openings 30 may also be formed in the surface of housing 12 to allow sound to pass through the walls of the housing.

A display such as display 14 may be mounted within upper housing portion 26. Display 14 may be, for example, a liquid crystal display (LCD), organic light emitting diode (OLED) display, or plasma display (as examples). A glass panel may be mounted in front of display 14. The glass panel may help add structural integrity to computer 10. For example, the glass panel may make upper housing portion 26 more rigid and may protect display 14 from damage due to contact with keys or other structures.

Figure 2:
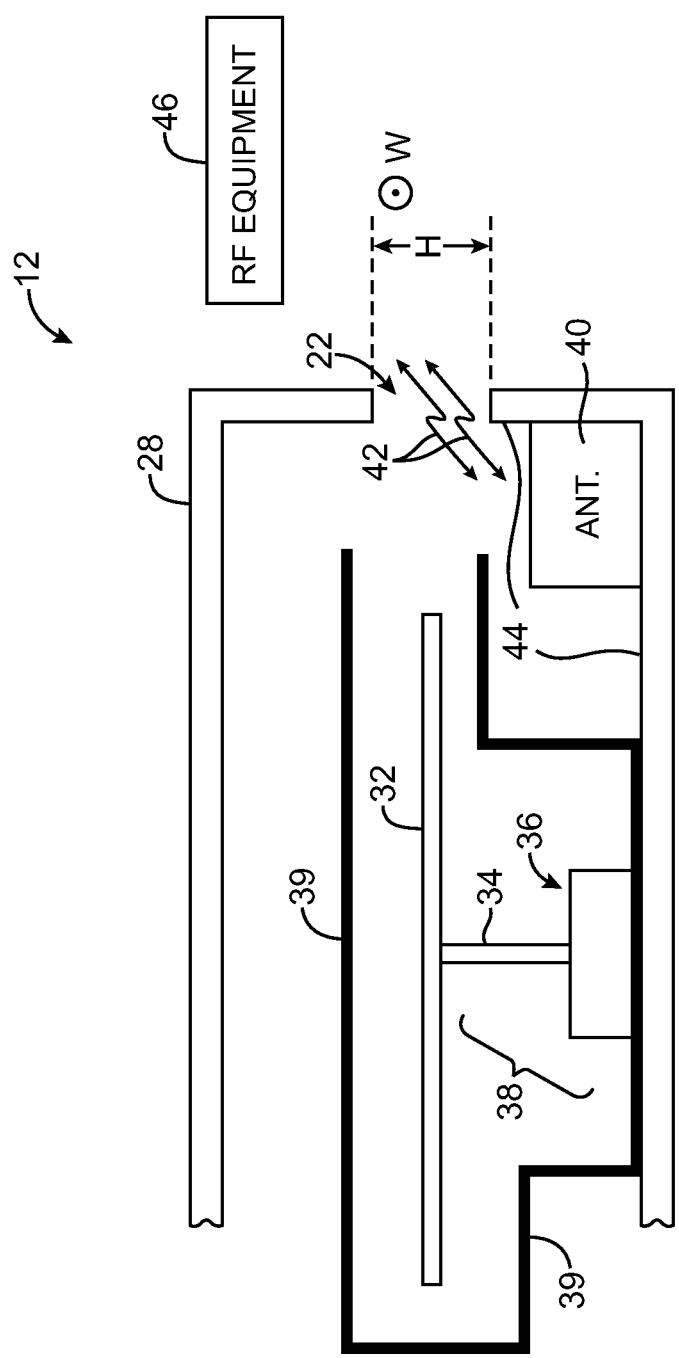
FIG. 2 is a cross-sectional side view of an illustrative electronic device such as a portable computer in the vicinity of a device housing portion that has a slot and an antenna in accordance with an embodiment of the present invention.

A cross-sectional view of a portion of lower housing portion 28 of housing 12 in the vicinity of slot 22 is shown in FIG. 2. As shown in FIG. 2, storage media such as optical disk 32 may be inserted into computer 10 through slot 22. A disk drive 38 (schematically depicted as base unit 36, rotating spindle 34, and metal drive housing 39 in FIG. 2) may be used to access data that is stored on optical drive 32. Data may also be written to drive 32 using optical disk drive 38.

To allow insertion of disk 32 into the cavity associated with the disk drive, the vertical and horizontal dimensions of slot 22 may be constructed to be larger than the corresponding dimensions of an optical disk (e.g., a CD or DVD). As shown in FIG. 2, for example, slot height H may be larger than the thickness of disk 32 (e.g., more than 1-5 mm). Similarly, the width W of slot 22 may be larger than the diameter of disk 32 (e.g., more than 12-14 cm). Computer 10 may, if desired, have other openings. For example, computer 10 may have openings such as slot 22 that receive other types of storage media or accessories. In general, these openings may have any suitable shape (e.g., rectangular, circular, polygonal, etc.). The use of slots that are generally rectangular in shape such as slot 22 of FIGS. 1 and 2 is merely illustrative.

Particularly in computers with conductive housings, the presence of an opening such as slot 22 may be used to provide a relatively unobstructed radio-frequency signal passageway between the interior and exterior of the housing. Conductive housing structures such as the metal wall structures that surround slot 22 may partially or fully block radio-frequency signals. This can make it difficult or impossible to locate an antenna directly behind such structures in the absence of slot 22.

In configurations in which slot 22 is available, slot 22 may be used to allow signals to pass between the interior and exterior of computer 10 without being blocked by a conductive housing wall. In particular, an antenna such as antenna 40 may be mounted in the interior or housing 12 in the vicinity of slot 22. In the FIG. 2 example, antenna 40 has been mounted to interior surface 44 of the wall of housing portion 28. This is merely illustrative. Antenna 40 may be mounted at any suitable location within housing 12, provided that the placement of antenna 40 does not prevent the use of drive 38. Metal drive housing 39 may help to isolate antenna 40 from the influence of drive 38 (e.g., to prevent rotating disk 32 from influencing the radio-frequency antenna signals that are associated with antenna 40 due to the Doppler effect).

Due to the relatively close proximity of antenna 40 to slot 22, radio-frequency signals can be received and transmitted through slot 22. This is illustrated by radio-frequency signal paths 42. During signal transmissions, radio-frequency signals may be transmitted from antenna 40 through slot 22. These transmitted signals may be received by radio-frequency (RF) equipment 46. Equipment 46 may transmit radio-frequency signals that are received by antenna 40 through slot 22. Equipment 46 may be, for example, a cellular telephone base station, a peer device, a wireless router, a computer with a wireless adapter, a storage device with wireless communications circuitry, a portable electronic device, a satellite, a radio tower, or any other suitable electronic equipment with wireless capabilities.

Antenna 40 may be used to handle any suitable communications bands of interest. For example, antennas such as antenna 40 and wireless communications circuitry in computer 10 may be used to handle cellular telephone communications in one or more frequency bands and data communications in one or more communications bands. Typical data communications bands that may be handled by the wireless communications circuitry in computer 10 include the 2.4 GHz band that is sometimes used for Wi-Fi® (IEEE 802.11) and Bluetooth® communications, the 5 GHz band that is sometimes used for Wi-Fi communications, the 1575 MHz Global Positioning System band, and 2G and 3G cellular telephone bands. These bands may be covered using single-band and multiband antennas. For example, cellular telephone communications can be handled using a multiband cellular telephone antenna. A single band antenna may be provided to handle Bluetooth® communications. Antenna 40 may, as an example, be a multiband antenna that handles local area network data communications at 2.4 GHz and 5 GHz (e.g., for IEEE 802.11 communications), a single band antenna that handles 2.4 GHz IEEE 802.11 communications and/or 2.4 GHz Bluetooth® communications, or a single band or multiband antenna that handles other communications frequencies of interest. These are merely examples. Any suitable antenna structures may be used by antenna 40 to cover any communications bands of interest.

Antenna 40 may be implemented using any suitable antenna configuration. For example, antenna 40 may be implemented as a monopole antenna, a dipole antenna, a patch antenna, an inverted-F antenna, an L-shaped antenna, a planar inverted-F antenna (PIFA), a slot antenna, a helical antenna, a hybrid antenna including two or more of these antenna structures, or any other suitable antenna structures.

With one suitable arrangement, which is described herein as an example, antenna 40 may be implemented using two conductive antenna elements mounted on a substrate. The elements may form a dipole antenna that is fed using an asymmetric transmission line such as a coaxial cable. One of the antenna elements may only weakly radiate and may serve as an impedance matching component, whereas the other of the antenna elements may serve as the primary radiating element. This configuration can improve the efficiency of the antenna at transmitting and receiving radio-frequency signals through slot 22.

The conductive antenna elements that form the dipole may be formed from wires, traces on flex circuit substrates, stamped metal foil patterns, metal parts, or any other suitable conductive structures. If desired, the conductive antenna elements in antenna 40 may be formed from planar traces (patches) on a rigid printed circuit board. This type of configuration is shown in FIG. 3.

Figure 3:
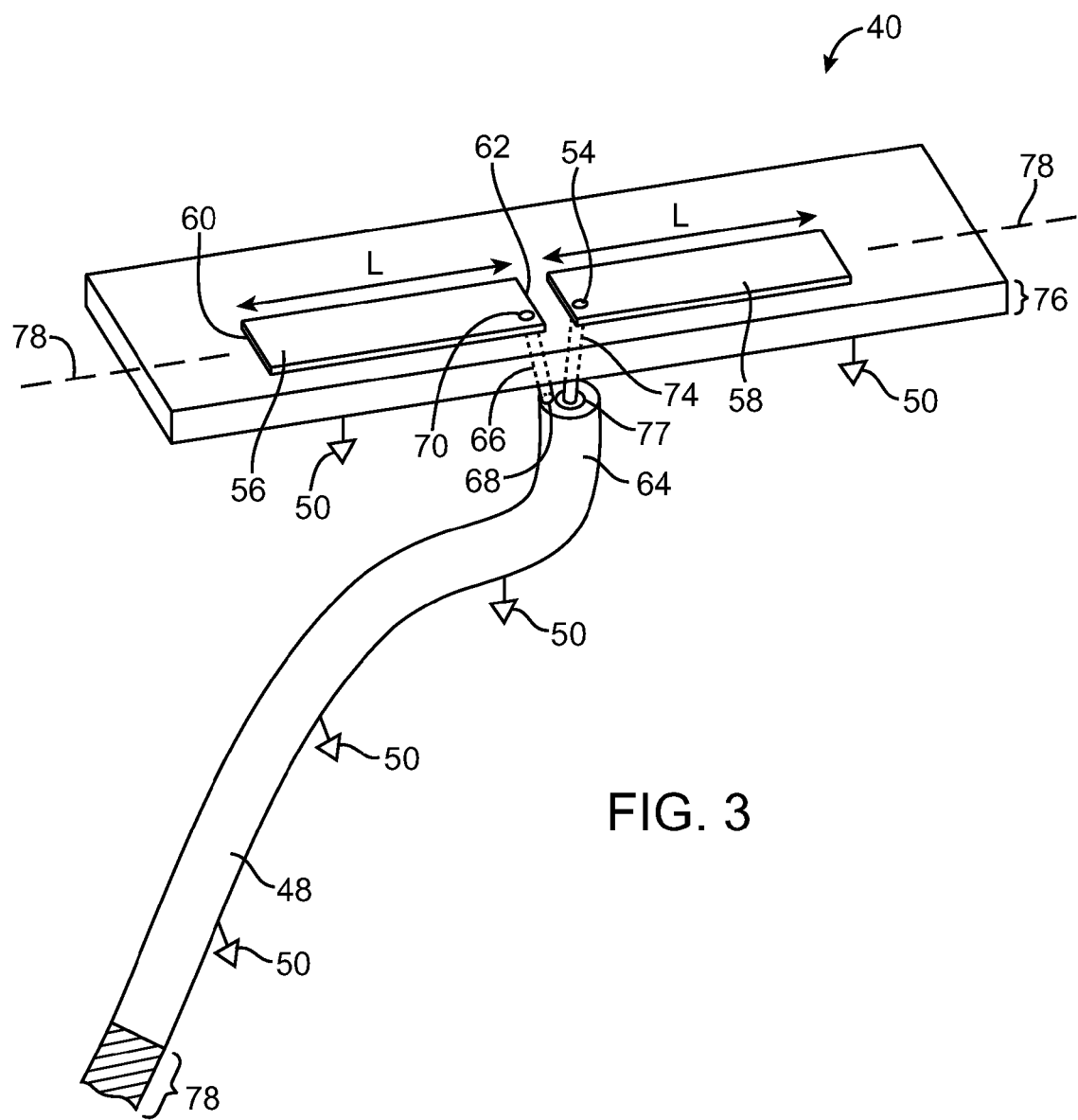
FIG. 3 is a perspective of an illustrative antenna that may be used in an electronic device such as a portable computer in accordance with an embodiment of the present invention.

As shown in the example of FIG. 3, antenna 40 may have conductive antenna elements such as first conductive antenna element 56 and second conductive antenna element 58. First conductive antenna element 56 and second conductive antenna element 58 may be formed from a conductive material such as metal. For example, first conductive antenna element 56 and second conductive antenna element 58 may be formed from copper, gold, brass, etc. First and second antenna elements 56 and 58 may be oriented so that their longitudinal axis 78 runs parallel to the longitudinal axis and long edges of slot 22.

First conductive antenna element 56 and second conductive antenna element 58 may be formed as patterned traces on a substrate such as substrate 76. Substrate 76 may be a dielectric substrate such as a printed circuit board substrate. An illustrative material that may be used as a printed circuit board substrate is fiberglass-filled epoxy.

If desired, other suitable dielectric materials may be used for dielectric substrate 76. For example, conductive elements 56 and 58 may be formed by plating and etching or otherwise depositing patterned copper traces or other conductive traces on a plastic carrier. The use of printed circuit board materials for substrate 76 is merely illustrative.

As shown in FIG. 3, antenna 40 may be coupled to circuitry in computer 10 using a transmission line such as coaxial cable 48. If desired, the transmission line may be implemented using a microstrip transmission line structure or other suitable transmission line configuration. The use of coaxial cable to transmit and receive radio-frequency signals for antenna 40 in the FIG. 3 example is merely illustrative.

The lower planar surface of substrate 76 and coaxial cable 48 may be grounded, as indicated by ground terminals 50. Ground terminals 50 for grounding cable 48 may be located at predetermined positions along the length of cable 48 (e.g., at quarter wavelength spacings) to improve impedance matching and antenna performance.

Transmission line structures such as coaxial cables are unbalanced. If desired, a balun may be used to help efficiently feed a balanced antenna structure such as a balanced dipole structure formed by equally sized first and second antenna elements 56 and 58 using an unbalanced transmission line path such as coaxial cable 48. To conserve space within housing 12, however, it may be desirable for the balun to be omitted.

Without a balun in place, the unbalanced coaxial cable can be used to feed antenna 40 in an unbalanced feed configuration. The first and second antenna elements 56 and 58 may be placed parallel to and close to the edge of slot 22 and other portions of conductive housing 12. In this position, first and second antenna elements 56 and 58 may interact with the conductive housing and other nearby ground structures to form a transmission line structure in which element 56 serves primarily as an impedance matching element for the unbalanced feed and in which element 58 serves primarily as a radiating element for antenna 40.

As shown in FIG. 3, coaxial cable 48 may have a conductive outer braid (shield) 64 that surrounds a dielectric layer 77. Conductive center conductor 74 may lie in the center of dielectric layer 77. In regions such as region 78, conductive outer braid layer 64 may be covered with an insulator such as a plastic jacket. Conductive center conductor 74 may serve as a positive antenna transmission line path and conductive outer braid conductor 64 may serve as a ground antenna transmission line path. Center conductor 74 (the positive antenna transmission line path) may pass through substrate 76 and may contact antenna element 58 at first antenna feed terminal 54. Outer conductor 64 may pass through substrate 76 and may contact antenna element 56 at second antenna feed terminal 70.

First antenna element 56 and second antenna element 58 may have lengths L. The length L may be selected to enhance radiation efficiency for antenna 40 in a communications band of interest. For example, the length L may be selected to be substantially equal to a quarter of a wavelength at a frequency of interest.

Figure 4:
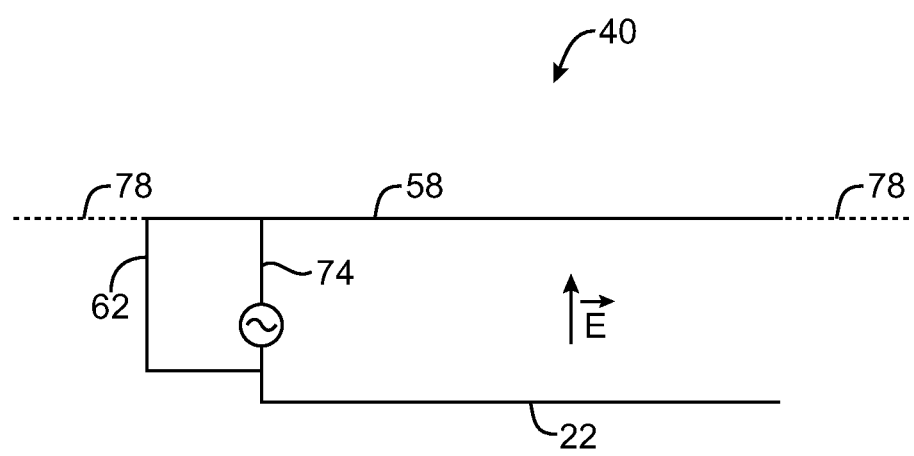
FIG. 4 is a schematic diagram showing how part of a dipole antenna of the type shown in FIG. 3 may operate as an inverted-F antenna in accordance with an embodiment of the present invention.

With the feed arrangement shown in FIG. 3, the first half of dipole antenna 40 (i.e., the portion corresponding to first antenna element 56) is approximately at ground potential due to the relatively short distance between points 68 and 70 and does not radiate significantly. Because element 56 is approximately a quarter wavelength in length, there is approximately a quarter wavelength between feed terminal 70 at end 62 of element 56 and open circuit end 60 of element 56. Open end 60 reflects impedance back to terminal 70 as a short circuit. This transforms the other portion of the dipole antenna (corresponding to second antenna element 58 and its associated ground structures) into an inverted-F antenna structure, as shown schematically in FIG. 4. The portion of antenna 40 formed from second element 58 actively radiates. The radiated field can propagate through slot 22 and exit housing 12. As shown in FIG. 4, antenna element 58 and the conductive portions of lower housing 28 that are associated with slot 22 serve as a transmission line. Because these housing portions 22 are maintained at ground potential, the radiated electric field E from antenna 40 tends to be vertical in the orientation of FIG. 4. The electric field polarization for antenna 40 is therefore perpendicular to longitudinal axis 78 of elements 58 and 56 and the longitudinal axis of slot 22. This allows the radio-frequency signals from antenna 40 to propagate through a relatively narrow slot 22 (i.e., through a slot with a small H value in FIG. 2). A conventional monopole having its longitudinal axis aligned with the slot's longer dimension would have its electric field oriented along the slot's longer dimension, thereby preventing propagation through a narrow slot.

With a dipole antenna structure such as that used by antenna 40 of FIG. 3, one half of the dipole radiates and the other half of the dipole serves as an impedance matching element. An advantage of using this type of structure is that the non-radiating half of the dipole exhibits a short-circuit behavior at end 62 of element 56, but does not have a clear-cut short circuit location as would be the case if an actual short circuit were created at end 62. This lack of a precisely defined location for the short circuit behavior of element 56 helps to enhance the bandwidth of antenna 40 by more efficiently supporting a greater range of operating frequencies than would otherwise be possible.

When no balun is used in feeding element 56 and 58, there is a modal mismatch between unbalanced transmission line 48 (i.e., the coaxial cable) and the balanced dipole structures of antenna 40. This modal mismatch creates a current flow on the surface of coaxial cable 48 that competes with antenna 40. By shorting outer conductor 64 of cable 48 to ground at predetermined locations (grounds 50), undesirable radiation cancellation effects arising from the coaxial cable surface current flow may be reduced. Grounding of cable 48 at the predetermined locations may also help to improve repeatability in manufacturing. Grounds 50 may be located at quarter-wavelength spaces along the length of cable 48 or a continuous ground structure may be used. Grounding may be performed by shorting cable 48 to the metal of housing 12 at desired locations.

If desired, additional antenna elements may be added to antenna 40 that help direct radiation towards slot 22. The additional antenna elements may be passive or may be actively fed. The additional antenna elements may serve as reflectors or directors and may help to ensure that field strengths are concentrated towards slot 22, rather than being directed towards undesired interior portions of housing 12.

Figure 5:
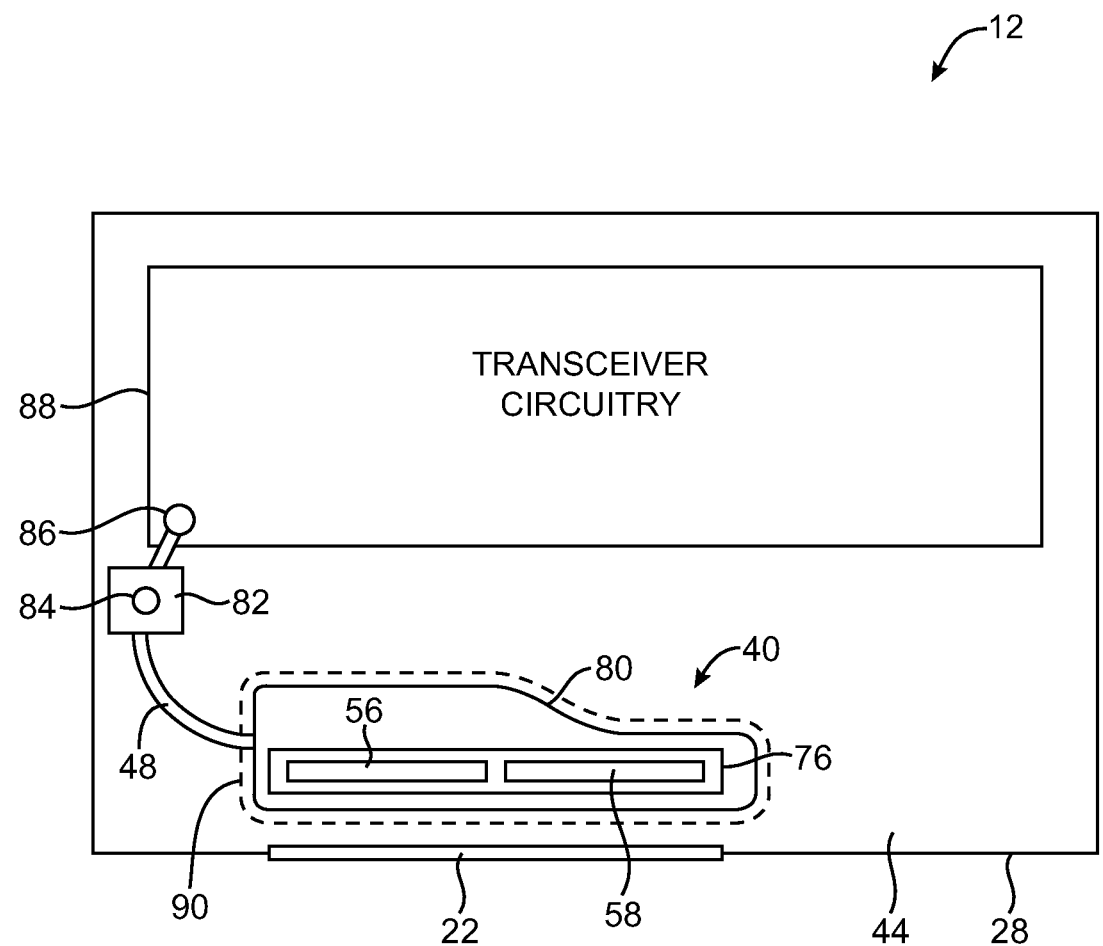
FIG. 5 is a top view showing how an antenna of the type shown in FIG. 3 may be mounted in an electronic device such as a portable computer in accordance with an embodiment of the present invention.

A top view of an illustrative configuration that may be used to mount antenna 40 within the interior of housing 12 in the vicinity of slot 22 is shown in FIG. 5. As shown in FIG. 5, antenna substrate 76 and associated first and second antenna elements 56 and 58 may be mounted to a conductive ground plate such as ground plate 80. Ground plate 80 may be grounded to an interior planar surface 44 of lower housing portion 28 of housing 12 (i.e., the interior volume of the optical drive portion of computer 10). Ground plate 80 may be physically and electrically attached to an inner planar surface of the housing of computer 10 using conductive adhesive and/or fasteners such as screws.

Housing 28 may be formed from a conductive material such as aluminum. The aluminum of housing 28 may be provided with an aluminum oxide coating or other insulating surface layer. To allow electrical contact between conductive ground plate 80 and the aluminum (or other metal) of housing portion 28, the aluminum oxide coating may be removed from region 90 (e.g., by laser removal techniques or chemical removal techniques). This type of arrangement may be used wherever electrical contact to housing 12 is desired.

Cable 48 may be grounded to housing portion 28 using grounding structures such as bracket 82. A screw hole and associated screw 84 may be used to attach bracket 82 and cable 48 to the housing. The screw may, for example, be screwed into a threaded boss in the metal structures of housing 12.

A coaxial cable connector such as a UFL connector 86 may be used to connect coaxial cable 48 to a printed circuit board or other suitable structure. In the example of FIG. 5, connector 86 has been attached to a printed circuit board 88 that includes radio-frequency transceiver circuitry. Circuitry such as circuitry 88 may be used in transmitting and receiving radio-frequency signals through antenna 40. Circuitry 88 may be, for example, a Bluetooth® module that handles Bluetooth® signals at 2.4 GHz.

Figure 6:
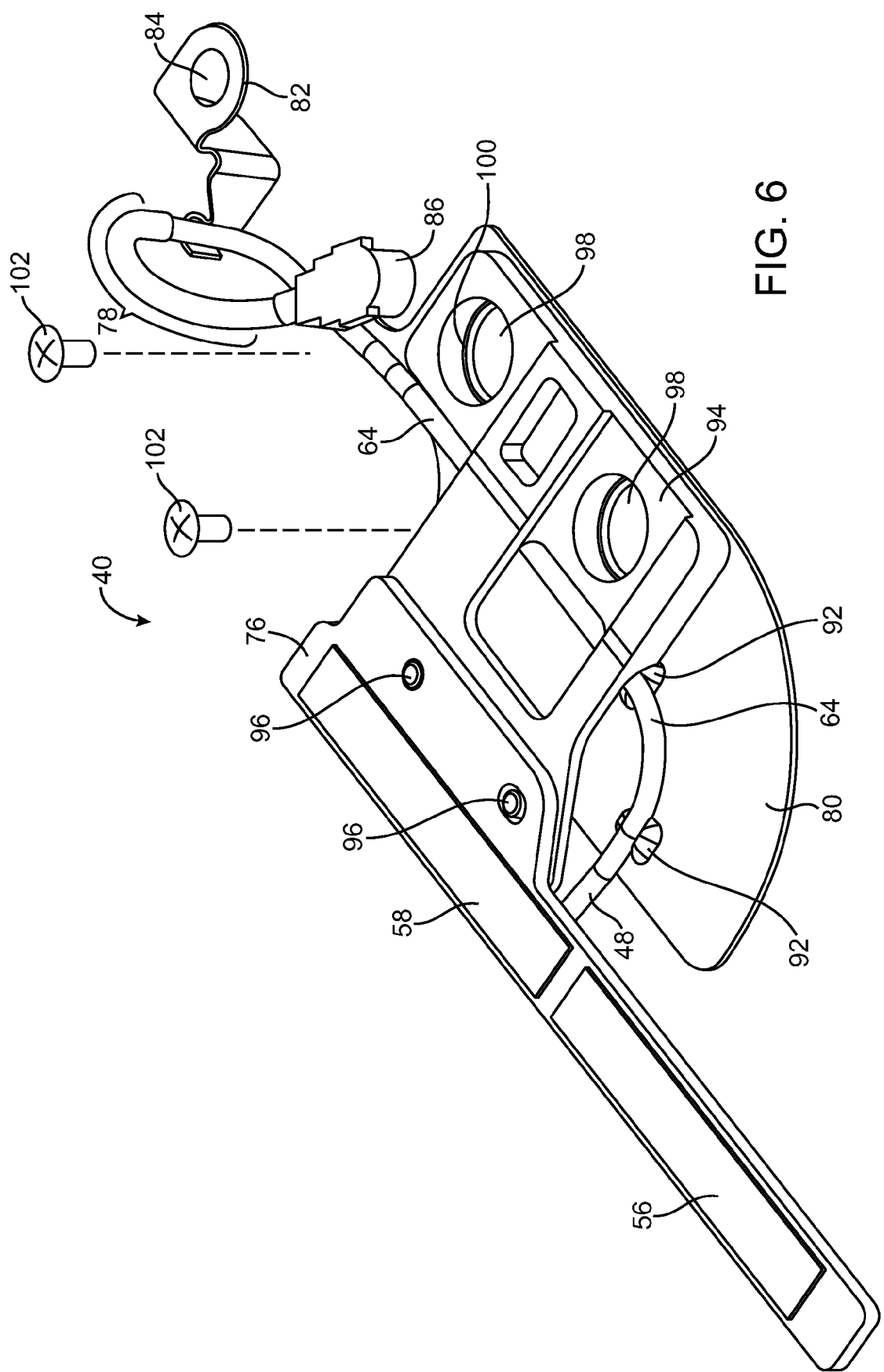
FIG. 6 is a perspective view of an illustrative antenna in accordance with an embodiment of the present invention.

A perspective view of an illustrative antenna 40 of the type shown in FIG. 5 is shown in FIG. 6. As shown in FIG. 6, antenna substrate 76 may be attached to a mounting structure such as mounting structure 94 or other suitable support structure. Substrate 76 may be attached to mounting structure 94 using fasteners, adhesive, or other suitable attachment mechanisms. In the example of FIG. 6, mounting structure 94 has portions that form heat stakes 96 to hold substrate 76 in place on mounting structure 94. Coaxial cable 48 has plastic coating in region 78. Elsewhere, coaxial cable 48 may be stripped to expose outer conductor 64. Conductor 64 may be electrically grounded to ground plate 80 continuously along its length or at discrete locations. In the arrangement shown in FIG. 6, outer conductor 64 is periodically connected to ground plate 80 using solder connections 92. Ground plate 80 may be formed from a sheet of brass or other metal or conductive material. Clip 82 may be formed from metal and may provide additional grounding of outer conductor 62 to housing 12.

Mounting structure 94 may be formed from a dielectric such as plastic. Mounting structure 94 may be connected to grounding plate 80 using a layer of conductive adhesive such as conductive adhesive layer 100. Antenna substrate support structure 94 may have screw holes such as holes 98 through which screws 102 may pass to screw structure 94 to housing 12. Lower housing portion 28 may have threaded holes that receive the threads of screws 102.

The foregoing is merely illustrative of the principles of this invention and various modifications can be made by those skilled in the art without departing from the scope and spirit of the invention.

What is claimed is:

1. An antenna system, comprising:
   a dielectric substrate;
   first and second conductive traces on the dielectric substrate that are aligned along a common longitudinal axis;
   a coaxial cable having an outer conductor and an inner conductor, wherein the outer conductor is connected to the first conductive trace and the inner conductor is connected to the second conductive trace;
   a support structure to which the dielectric substrate is attached; and
   a grounding plate on which the support structure is mounted, wherein the coaxial cable outer conductor is electrically grounded to the grounding plate.

2. The antenna system defined in claim 1 further comprising a plurality of solder connections between the coaxial cable outer conductor and the grounding plate.

3. The antenna system defined in claim 2 wherein the grounding plate and the support structure comprise portions defining screw holes, the antenna system further comprising:
   a metal bracket that is electrically connected to the coaxial cable outer conductor; and
   a coaxial cable connector connected to an end of the coaxial cable.

4. The antenna system defined in claim 1 wherein the antenna system is in an electric device comprising a conductive housing and a media drive opening and wherein the first and second conductive traces are parallel to the media drive opening.

5. The antenna system defined in claim 1 wherein the antenna system is in an electric device comprising a conductive housing and a media drive opening having a width and a height that is less than the width and wherein the first and second conductive traces are parallel to the width of the media drive opening.

6. The antenna system defined in claim 1 wherein the antenna system is in an portable computer comprising a conductive housing and an optical disk drive slot and wherein the first and second conductive traces are oriented and configured to transmit and receive radio-frequency antenna signals through the optical disk drive slot.

7. The antenna system defined in claim 1 wherein the antenna system is operable to transmit and receive radio-frequency signals in at least a first given wavelength, the antenna system further comprising a plurality of solder connections between the coaxial cable outer conductor and the grounding plate.

8. The antenna system defined in claim 7 wherein adjacent solder connections are spaced apart by a distance approximately equal to one-quarter of the given wavelength.

9. The antenna system defined in claim 1 wherein the antenna system is in an electric device comprising a conductive housing and a media drive opening, the antenna system further comprising:
at least one antenna element that directs radio-frequency signals from the first and second conductive traces through the media drive opening.

10. The antenna system defined in claim 1 wherein the dielectric substrate at least partially overlaps the support structure.

11. The antenna system defined in claim 1 wherein the support structure at least partially overlaps the grounding plate.

12. The antenna system defined in claim 1 wherein the dielectric substrate at least partially overlaps the support structure and wherein the support structure at least partially overlaps the grounding plate.

13. The antenna system defined in claim 1 wherein the coaxial cable is routed at least partially between the support structure and the grounding plate.

14. An antenna system in a conductive electronic device housing having a media drive opening, the antenna system comprising:
a dielectric substrate;
first and second conductive traces on the dielectric substrate that are aligned along a common longitudinal axis and that are parallel to the media drive opening;
at least one antenna element that directs radio-frequency signals from the first and second conductive traces through the media drive opening.

15. The antenna system defined in claim 14 wherein the at least one antenna element reflects radio-frequency signals from the first and second conductive traces that are directed towards interior portions of the conductive electronic device housing so that the radio-frequency signals pass through the media drive opening.

16. The antenna system defined in claim 14 wherein the first and second conductive traces are located between the media drive opening and the at least one antenna element that directs radio-frequency signals from the first and second conductive traces towards the media drive opening.

17. The antenna system defined in claim 14 further comprising:
a support structure to which the dielectric substrate is attached; and
a grounding plate on which the support structure is mounted.

18. The antenna system defined in claim 17 further comprising:
a coaxial cable having an outer conductor and an inner conductor, wherein the outer conductor is connected to the first conductive trace and the inner conductor is connected to the second conductive trace, wherein the coaxial cable outer conductor is electrically grounded to the grounding plate.

19. The antenna system defined in claim 14 wherein the at least one antenna element that directs radio-frequency signals from the first and second conductive traces towards the media drive opening comprises at least one passively fed antenna element.

20. An antenna system in an electronic device comprising a conductive housing and a media drive opening having a width and a height that is less than the width, the antenna system comprising:
a dielectric substrate;
first and second conductive antenna elements on the dielectric substrate that are aligned along a common longitudinal axis and that are parallel to the width of the media drive opening, so that radio-frequency signals for the antenna system pass through the media drive opening; and
a transmission line having first and second conductors coupled respectively to the first and second conductive antenna elements.

21. The antenna system defined in claim 20 further comprising:
a support structure to which the dielectric substrate is attached; and
a grounding plate in which the support structure is mounted, wherein the second conductor of the transmission line is electrically grounded to the grounding plate.

22. The antenna system defined in claim 21 wherein the grounding plate is electrically grounded to the conductive housing of the electronic device.

23. The antenna system defined in claim 21 further comprising a plurality of solder connections between the second conductor of the transmission line and the grounding plate.

24. The antenna system defined in claim 23 wherein the transmission line comprises a coaxial cable and wherein the second conductor of the transmission line comprises an outer conductor of the coaxial cable.

* * * * *